United States Patent [19]

Sextl et al.

[11] Patent Number: 5,362,541
[45] Date of Patent: Nov. 8, 1994

[54] SHAPED ARTICLES FOR HEAT INSULATION

[75] Inventors: Gerhard Sextl, Rodenbach; Roland Reuter, Darmstadt; Peter Kleinschmit, Hanau; Rudolf Schwarz, Wasserlos; Ilona Sporys, Maintal, all of Germany

[73] Assignee: Degussa Aktiengesellschaft, Frankfurt am Main, Germany

[21] Appl. No.: 147,095

[22] Filed: Nov. 3, 1993

Related U.S. Application Data

[63] Continuation of Ser. No. 652,399, Feb. 7, 1991, abandoned, which is a continuation of Ser. No. 539,364, Jun. 15, 1990, abandoned, which is a continuation of Ser. No. 397,975, Aug. 24, 1989, abandoned.

[30] Foreign Application Priority Data

Aug. 24, 1988 [DE] Germany ............... 3828669

[51] Int. Cl.⁵ .................. B32B 1/02; B32B 9/00
[52] U.S. Cl. .......................... 428/69; 428/76
[58] Field of Search ............ 428/69, 76; 156/70

[56] References Cited

U.S. PATENT DOCUMENTS

| | | | |
|---|---|---|---|
| 2,012,617 | 8/1935 | Munters | 428/76 |
| 2,067,015 | 1/1937 | Munters | 428/76 |
| 2,188,007 | 1/1940 | Kistler | 252/6 |
| 4,159,359 | 6/1979 | Pelloux-Gervais et al. | 428/76 |
| 4,269,323 | 5/1981 | Ito et al. | 220/423 |
| 4,304,824 | 12/1981 | Karpinski | 428/69 |
| 4,359,496 | 11/1982 | Kratel et al. | 428/75 |
| 4,399,175 | 8/1983 | Kummermehr et al. | 428/76 |
| 4,444,821 | 4/1984 | Young et al. | 428/69 |
| 4,447,345 | 5/1984 | Kummermehr et al. | 252/62 |
| 4,492,725 | 1/1985 | Ishihara et al. | 428/69 |
| 4,495,167 | 1/1985 | Nauroth et al. | 423/339 |
| 4,556,593 | 12/1985 | Hughes | 428/72 |
| 4,636,415 | 1/1987 | Barito et al. | 428/68 |
| 4,636,416 | 1/1987 | Kratel et al. | 428/69 |
| 4,681,788 | 7/1987 | Barito et al. | 428/448 |
| 4,798,753 | 1/1989 | Abuaf et al. | 428/69 |

FOREIGN PATENT DOCUMENTS

| | | |
|---|---|---|
| 15935-47 | 10/1947 | Australia . |
| 0047494 | 3/1982 | European Pat. Off. . |
| 732594 | 9/1932 | France . |
| 2321025 | 3/1977 | France . |
| 2443390 | 3/1976 | Germany . |

*Primary Examiner*—Alexander S. Thomas
*Attorney, Agent, or Firm*—Beveridge, DeGrandi, Weilacher & Young

[57] ABSTRACT

A preferably platelike form body for use as heat insulation, consisting of:

a) a finely divided, powdery or fibrous material, b) a microporous casing and c) a gas and watertight casing.

The form body is produced by optionally drying the powdery or fibrous material, optionally placing it into a microporous casing, optionally pressing it and then optionally drying it. Then, the powdery material is placed with the microporous casing into a gas and watertight casing. This gas and watertight casing is optionally evacuated and sealed.

1 Claim, No Drawings

SHAPED ARTICLES FOR HEAT INSULATION

This application is a continuation of U.S. patent application Ser. No. 07/652,399, filed Feb. 7, 1991 now abandoned, which is a continuation of U.S. patent application Ser. No. 07/539,364, filed Jun. 15, 1990 (now abandoned), which was a continuation of U.S. patent application Ser. No. 07/397,975 filed Aug. 24, 1989 (now abandoned), which applications are entirely incorporated herein by reference.

The present invention relates to shaped articles for use as thermal heat insulation bodies as well as to the method of production of same. In a further aspect, the present invention relates to platelike shaped bodies of insulating material.

SUMMARY OF THE INVENTION

The subject matter of the invention relates to insulation bodies, preferably platelike formed articles for use as heat insulation. The essential components of the articles of the invention are:

a) a finely divided, powdery or fibrous material and b) a gas and watertight casing or covering which encapsulates this finely divided, powdery or fibrous material.

The finely divided, powdery or fibrous material can be pressed in a microporous casing.

The finely divided, powdery or fibrous material can be dried in a microporous casing.

In a preferred embodiment the microporous casing containing the finely divided, powdery or fibrous material in a pressed and dried state can be inserted into the gas and watertight casing. Thus, the finely divided filler can be first placed or inserted into the microporous casing and then can be dried followed by pressing; or the pressing can be done first followed by drying.

The shaped body of the invention can be produced by:

a) optionally first drying a finely divided, powdery or fibrous material at a temperature sufficient to expel the surface water, b) optionally first pressing the powdery or fibrous material, c) placing the optionally dried and optionally pressed powdery or fibrous material into a gas and watertight casing which is provided with an evacuation opening, d) optionally evacuating the gas and watertight casing, and e) closing the evacuation opening of the gas and watertight casing to seal the contents therein from permeation by moisture and air.

In a preferred embodiment of the method of the invention, the finely divided, powdery or fibrous material can be dried in a microporous casing.

In an especially preferred embodiment of the method of invention, the finely divided, powdery or fibrous material can be pressed in a microporous casing and optionally dried thereafter.

The microporous casing, which is basically used to hold the finely divided, powdery material together in a desired shape or form during the drying and pressing, can be a foil or a film of microporous material consisting e.g. of polypropylene, polyester, polyethylene or filter paper.

The term "microporous" is used herein in its commonly understood meaning; i.e. a material with pores that are only visible under a microscope.

In general, any foil or material can be used for this purpose which allows air and moisture to pass through it and retains the finely divided, powdery material therein in the desired shape.

In principle, any powdery material the chemical properties of which do not change in the course of time can be used as a finely divided, powdery material.

An exception is constituted by a finely divided silicon dioxide (silica) material prepared by reacting an alkali water glass and a mineral acid for precipitating the silica, which is used alone without being mixed with other silicas or powdery materials.

It can be significant, due to the differing heat-insulating properties of the materials, whether the gas and watertight casing is evacuated or not. The gas and water-tight casing can be a variety of materials; for example, a flexible aluminum foil. Other examples of flexible metal foils are found in EP-A 0190 582 and EP--A 0254 993.

A hydraulic press can be used for pressing the bodies. Pressures of from 30 to 100 $kN/cm^2$ are typical. The resulting platelike article is in the form of a panel or slab that can readily be employed for insulation purposes.

The following materials or combinations of materials can be used in an evacuated or non-evacuated casing:

Mixtures of various precipitated silicas such as e.g. Sipernat 22 LS and FK 500 LS, Sipernat 22 LS and FK 320 DS, FK 500 LS and FK 320 DS.

Mixtures of precipitated and pyrogenic silicas such as e.g. Sipernat 22 LS, FK 320 DS and/or FK 500 LS with Aerosil A 200 and/or Aerosil A 300.

Mixtures of precipitated silicas and silica gels such as Sipernat 22 LS, FK 320 DS and/or FK 500 LS with silica gels (e.g. Syloid 72 and Syloid 244).

Mixtures of precipitated silicas and mineral substances such as e.g. Sipernat 22 LS, FK 320 DS and/or FK 500 LS with perlites, kaolinite, montmorillonite, mica, zeolites and/or calcium sulfate (gypsum).

Mixtures of precipitated silicas and ground glasses or vitreous substances such as e.g. Sipernat 22 LS, FK 320 DS and/or FK 500 LS with glass powder and/or very fine glass wool.

Mixtures of precipitated silicas and carbon blacks such as e.g. Sipernat 22 LS, FK 320 DS and/or FK 500 LS with furnace blacks, lampblacks and/or gas blacks.

Mixtures of precipitated silicas and synthetic materials such as e.g. Sipernat 22 LS, FK 320 DS and/or FK 500 LS with synthetic or natural zeolites or aluminum silicates or other silicate substances (calcium silicate, kieselguhr, Extrusil).

Mixtures of precipitated silicas and non-metallic elements such as e.g. Sipernat 22 LS, FK 320 DS and/or FK 500 LS with sulfur and/or ground carbon.

Mixtures of precipitated silicas and fibers such as e.g. Sipernat 22 LS, FK 320 DS and/or FK 500 LS with inorganic or organic fibers (viscose staple fiber or fine plastic fibers of all types).

Mixtures of precipitated silicas and pyrogenic metal oxides such as e.g- Sipernat 22 LS, FK 320 DS and/or FK 500 LS with pyrogenic aluminum oxide, iron oxide and/or titanium dioxide.

Pyrogenic silicas such as e.g. A 200, A 300, A 380, A 450 (OX 50), hydrophobic Aerosil types, specially pretreated Aerosils, MOX-type Aerosils, Aerosil COK 84.

Mixtures of various pyrogenic silicas such as e.g. A 200 and A 300, A 200 or A 300 with hydrophobic, pyrogenic silicas, A 200 or A 300 with specially pretreated Aerosil types.

Mixtures of pyrogenic silicas and silica gels such as e.g. A 200 and/or A 300 with silica gels (e.g. Syloid 72 and Syloid 244).

Mixtures of pyrogenic silicas and mineral substances such as e.g. A 200 and/or A 300 with perlites, kaolinite, montmorillonite, mica, zeolites and/or calcium sulfate (gypsum).

Mixtures of pyrogenic silicas and ground glasses or vitreous materials such as e.g. A 200 and/or A 300 with glass powder and/or very fine glass wool.

Mixtures of pyrogenic silicas and carbon blacks, gas blacks such as e.g. A 200 and/or A 300 with furnace blacks, flame blacks and/or gas blacks, mixtures of pyrogenic silicas and synthetic materials such as e.g. A 200 and/or A 300 with synthetic or natural zeolites or aluminum silicates or other silicate substances (calcium silicate, kieselguhr, Extrusil).

Mixtures of pyrogenic silicas and synthetic waste materials such as e.g. A 200 and/or A 300 with flue dusts, power-plant ashes, ashes from all types of combustion plants.

Mixtures of pyrogenic silicas and non-metallic elements such as e.g. A 200 and/or A 300 with sulfur and/or ground carbon.

Mixtures of pyrogenic silicas and fibers such as e.g. A 200 and/or A 300 with inorganic or organic fibers (viscose staple fiber or fine plastic fibers of all types).

Mixtures of pyrogenic silicas and pyrogenic metal oxides such as e.g. A 200 and/or A 300 with pyrogenic aluminum oxide, iron oxide, titanium dioxide.

Carbon blacks such as e.g. furnace blacks, flame blacks, gas blacks.

Mixtures of various carbon blacks such as e.g. furnace blacks with flame blacks, furnace blacks with gas blacks, flame blacks with gas blacks.

Mixtures of carbon blacks and silica gels such as e.g. carbon blacks or carbon-black mixtures with silica gels (e.g. Syloid 72 and Syloid 244).

Mixtures of carbon blacks and mineral substances such as e.g. carbon blacks or carbon-black mixtures with perlites, kaolinite, montmorillonite, mica, zeolites and/or calcium sulfate (gypsum).

Mixtures of carbon blacks and ground glasses or vitreous materials such as e.g. carbon blacks or carbon-black mixtures with glass powder and/or very fine glass wool.

Mixtures of carbon blacks and synthetic materials such as e.g. carbon blacks or carbon-black mixtures with synthetic or natural zeolites or aluminum silicates or other silicate substances (calcium silicate, kieselguhr, Extrusil).

Mixtures of carbon blacks and synthetic waste materials such as e.g. carbon blacks or carbon-black mixtures with flue dusts, power-plant ashes, ashes from all types of combustion plants.

Mixtures of carbon blacks and non-metallic elements such as e.g. carbon blacks or carbon-black mixtures with sulfur and/or ground carbon.

Mixtures of carbon blacks and fibers such as e.g. carbon blacks or carbon-black mixtures with inorganic or organic fibers (viscose staple fiber or fine plastic fibers of all types).

Mixtures of carbon blacks and pyrogenic metal oxides such as e.g. carbon blacks or carbon-black mixtures with pyrogenic aluminum oxide, iron oxide, titanium dioxide.

Zeolites such as e.g. zeolite A, zeolite X, zeolite Y, pretreated zeolites.

Mixtures of various zeolites such as e.g. zeolite X with zeolite Y.

Mixtures of zeolites and silica gels such as e.g. zeolites or zeolite mixtures with silica gels (e.g. Syloid 72 and Syloid 244).

Mixtures of zeolites and mineral substances such as e.g. zeolites or zeolite mixtures with perlites, kaolinite, montmorillonite, mica and/or calcium sulfate (gypsum).

Mixtures of zeolites and ground glasses or vitreous materials such as e.g. zeolites or zeolite mixtures with glass powder and/or very fine glass wool.

Mixtures of zeolites and synthetic materials such as e.g. zeolites or zeolite mixtures with synthetic aluminum silicates or other silicate substances (calcium silicate, kieselguhr, Extrusil).

Mixtures of zeolites and synthetic waste materials such as e.g. zeolites or zeolite mixtures with flue dusts, power-plant ashes, ashes from all types of combustion plants.

Mixtures of zeolites and non-metallic elements such as e.g. zeolites or zeolite mixtures with sulfur and/or ground carbon.

Mixtures of zeolites and fibers such as e.g. zeolites or zeolite mixtures with inorganic or organic fibers (viscose staple fiber or fine plastic fibers of all types).

Mixtures of zeolites and pyrogenic metal oxides such as e.g. zeolites or zeolite mixtures with pyrogenic aluminum oxide, iron oxide, titanium dioxide.

Silica gels such as e.g. Syloid 72, Syloid 244.

Mixtures of various silica gels such as e.g. Syloid 72 with Syloid 244. differently pretreated silica gels.

Mixtures of silica gels and mineral substances such as e.g. silica gels or silica-gel mixtures with perlites, kaolinite, montmorillonite, mica and/or calcium sulfate (gypsum).

Mixtures of silica gels and ground glasses or vitreous materials such as e.g. silica gels or silica-gel mixtures with glass powder and/or very fine glass wool.

Mixtures of silica gels and synthetic materials such as e.g. silica gels or silica-gel mixtures with synthetic aluminum silicates or other silicate substances (calcium silicate, kieselguhr, Extrusil).

Mixtures of silica gels and synthetic waste materials such as e.g. silica gels or silica-gel mixtures with flue dusts, power-plant ashes, ashes from all types of combustion plants.

Mixtures of silica gels and non-metallic elements such as e.g. silica gels or silica-gel mixtures with sulfur and/or ground carbon.

Mixtures of silica gels and fibers such as e.g. silica gels or silica-gel mixtures with inorganic or organic fibers (viscose staple fiber or fine plastic fibers of all types).

Mixtures of silica gels and pyrogenic metal oxides such as e.g. silica gels or silica-gel mixtures with pyrogenic aluminum oxide, iron oxide, titanium dioxide.

Aluminum silicates.

Mixtures of various aluminum silicates such as e.g. different types of aluminum silicate, differently pretreated aluminum silicates.

Mixtures of aluminum silicates and mineral substances such as e.g. aluminum silicates or aluminum-silicate mixtures with perlites, kaolinite, montmorillonite, mica and/or calcium sulfate (gypsum).

Mixtures of aluminum silicates and ground glasses or vitreous materials such as e.g. aluminum silicates or aluminum-silicate mixtures with glass powder and/or very fine glass wool.

Mixtures of aluminum silicates and synthetic materials such as e.g. aluminum silicates or aluminum-silicate mixtures with other silicate substances (calcium silicate, kieselguhr, Extrusil).

Mixtures of aluminum silicates and synthetic waste materials such as e.g. aluminum silicates or aluminum-silicate mixtures with flue dusts, power-plant ashes, ashes from all types of combustion plants.

Mixtures of aluminum silicates and non-metallic elements such as e.g. aluminum silicates or aluminum-silicate mixtures with sulfur and/or ground carbon.

Mixtures of aluminum silicates and fibers such as e.g. aluminum silicates or aluminum-silicate mixtures with inorganic or organic fibers (viscose staple fiber or fine plastic fibers of all types).

Mixtures of aluminum silicates and pyrogenic metal oxides such as e.g. aluminum silicates or aluminum-silicate mixtures with pyrogenic aluminum oxide, iron oxide, titanium dioxide.

Metal oxides (pyrogenic or precipitated) such as e.g. aluminum oxide, iron oxides, titanium dioxide, zirconium dioxide.

Mixtures of various metal oxides (pyrogenic or precipitated) such as e.g. aluminum oxide with various iron oxides, aluminum oxide with titanium dioxide, titanium oxide with various iron oxides.

Mixtures of metal oxides (pyrogenic or precipitated) and mineral substances such as e.g. aluminum oxide, various iron oxides, titanium dioxide and/or zirconium dioxide with perlites, kaolinite, montmorillonite, mica and/or calcium sulfate (gypsum).

Mixtures of metal oxides (pyrogenic or precipitated) and ground glasses or vitreous materials such as e.g. aluminum oxide, various iron oxides, titanium dioxide and/or zirconium dioxide with glass powder and/or very fine glass wool.

Mixtures of metal oxides (pyrogenic or precipitated) and synthetic materials such as e.g. aluminum oxide, various iron oxides, titanium dioxide and/or zirconium dioxide with silicate substances (calcium silicate, kieselguhr, Extrusil).

Mixtures of metal oxides (pyrogenic or precipitated) and synthetic waste materials such as e.g. aluminum oxide, various iron oxides, titanium dioxide and/or zirconium dioxide with flue dusts, power-plant ashes, ashes from all types of combustion plants.

Mixtures of metal oxides (pyrogenic or precipitated) and non-metallic elements such as e.g. aluminum oxide, various iron oxides, titanium dioxide and/or zirconium dioxide with sulfur and/or ground carbon.

Mixtures of metal oxides (pyrogenic or precipitated) and fibers such as e.g. aluminum oxide, various iron oxides, titanium dioxide and/or zirconium dioxide with inorganic or organic fibers (viscose staple fiber or fine plastic fibers of all types).

The following can also be used as precipitated silicic acids:
HISIL T 600, HISIL T 690 of PPG
Tixosil 333 of Rhone-Poulenc
Hoesch SM 614 of AKZO
Zeothix 265 and Zeothix 177 of Huber.

DETAILED EMBODIMENTS OF THE INVENTION

Examples

The shaped bodies of the invention were produced with the following mixtures in accordance with the method of the invention (Table 1).

The particular values determined for the heat conductivity are also shown in Table 1.

TABLE 1

| | Portion % by weight | Other Components | Portion % by weight | Density of the form body (g/l) | Heat Conductivity (mW/m/K) (at p <1 mbar) |
|---|---|---|---|---|---|
| 1. Mixtures of precipitated silicas with perlites: | | | | | |
| Precipitated silicic acid | | | | | |
| Sipernat 22 LS | 35 | Perlite | 75 | 210 | 22 |
| Sipernat 22 LS | 50 | Perlite | 50 | 190 | 18 |
| Sipernat 22 LS | 75 | Perlite | 25 | 200 | 12 |
| FK 500 LS | 25 | Perlite | 75 | 215 | 20 |
| FK 500 LS | 50 | Perlite | 50 | 205 | 16 |
| FK 500 LS | 75 | Perlite | 25 | 195 | 12 |
| 2. Mixtures of Aerosil A 200 and Aerosil A 300 with perlites: | | | | | |
| Aerosil type | | | | | |
| A 200 | 25 | Perligran powder (perlite) | 75 | 260 | 10 |
| A 200 | 50 | Perligran powder (perlite) | 50 | 190 | 9 |
| A 200 | 75 | Perligran powder (perlite) | 25 | 155 | 9 |
| A 300 | 25 | Perligran powder (perlite) | 75 | 260 | 10 |
| A 300 | 50 | Perligran powder (perlite) | 50 | 190 | 9 |
| A 300 | 75 | Perligran powder (perlite) | 25 | 150 | 7 |

The powdery of fibrous materials which can be used in accordance with the invention are distinguished e.g.

by means of the following physical and chemical characterizing data:

|  |  | AEROSIL 200 | AEROSIL 300 | AEROSIL 380 | AEROSIL OX 50 | AEROSIL COK 84 |
|---|---|---|---|---|---|---|
| Surface according to BET | $m^2/g$ | 200 ± 25 | 300 ± 30 | 380 ± 30 | 50 ± 15 | 170 ± 30 |
| Average size of the primary particles | Nanometer | 12 | 7 | 7 | 40 | — |
| Tamped density 1) | g/l | ca. 50 | ca. 50 | ca. 50 | ca. 130 | ca. 50 |
| drying loss 2) (2 h at 105° C.) upon completion | % | <1.5 | <1.5 | <1.5 | <1.5 | <1.5 |
| Annealing loss 2) 7) (2 h at 1000° C.) | % | <1 | <2 | <2.5 | <1 | <1 |
| ph 3) (in 4% aqueous dispersion) | % | 3.6–4.3 | 3.6–4.3 | 3.6–4.3 | 3.8–4.5 | 3.6–4.3 |
| $SiO_2$ 5) | % | >99.8 | >99.8 | >99.8 | >99.8 | 82–86 |
| $Al_2O_3$ 5) | % | <0.05 | <0.05 | <0.05 | <0.08 | 14–18 |
| $Fe_2O_3$ 5) | % | <0.003 | <0.003 | <0.003 | <0.01 | <0.1 |
| $TiO_2$ 5) | % | <0.03 | <0.03 | <0.03 | <0.03 | <0.03 |
| HCl 5) 10) | % | <0.025 | <0.025 | <0.025 | <0.01 | <0.1 |
| Tailings 4) according to Mocker (45 μm) | % | <0.05 | <0.05 | <0.05 | <0.1 | <0.1 |

1) according to DIN 52 194
2) according to DIN 55 921
3) according to DIN 53 200
4) according to DIN 53 580
5) relative to the substance annealed 2 hours at 1000° C.
7) relative to the substance dried 2 hours at 105° C.
10) HCl content is a component of the annealing loss

|  |  | EXTRUSIL |
|---|---|---|
| Surface according to BET 1) | $m^2/g$ | 35 |
| Average size of the agglomerates | μm | 5 8) |
| Tamped density 2) | g/l | 300 |
| Drying loss 2) (2 h at 105° C.) upon leaving the supplier | % | 6 |
| Annealing loss (2 h at 1000° C.) 4) 10) | % | 7 |
| pH (in 5% aqueous dispersion) 5) |  | 10 |
| DBP absorption 6) 10) | g/100 g | 160 |
| $SiO_2$ 11) | % | 91 |
| $Al_2O_3$ 11) | % | 0.2 |
| CaO 11) | % | 6 |
| $Na_2O$ 11) | % | 2 |
| $Fe_2O_3$ 11) | % | 0.03 |
| $SO_3$ 11) | % | — |
| $Cl^-$ 11) | % | 0.8 |
| Tailings according to Mocker (45 μm) 7) | % | 0.2 |

1) according to DIN 66 131
2) according to DIN ISO 787/XI, JIS K 5101/18 (non-sieved)
3) according to DIN ISO 787/II, ASTM D 280, JIS K 5101/21
4) according to DIN 55921, ASTM D 1208, JIS K 5101/23
5) according to DIN ISO 787/IX, ASTM D 1208, JIS K 5101/24
6) according to DIN 53601, ASTM D 2414
7) according to DIN ISO 787/XVIII, JIS K 5101/20
8) Coulter counter, 100 μm capillary
10) relative to the substance dried 2 hours at 105° C.
11) relative to the substance annealed 2 hours at 1000° C.

|  |  | FK 320 DS | FK 500 LS | SIPERNAT 22 LS |
|---|---|---|---|---|
| Surface according to BET 1) | $m^2/g$ | 170 | 450 | 190 |
| Average size of the agglomerates | μm | 4 9) | 3.5 9) | 4.5 9) |
| Tamping density 2) | g/l | 80 | 80 | 80 |
| Drying loss (2 h at 105° C.) upon leaving the supplier | % | 6 | 3 | 6 |
| Annealing loss (2 h at 1000° C.) 4) 10) | % | 5 | 5 | 5 |
| pH (in 5% aqueous dispersion) 5) |  | 6.3 | 6.5 | 6.3 |
| DBP absorption 6) 10) | g/100 g | 230 | 330 | 270 |
| $SiO_2$ 11) | % | 98 | 98.5 | 98 |
| $Na_2O$ 11) | % | 1 | 0.6 | 1 |
| $Fe_2O_3$ 11) | % | 0.03 | 0.03 | 0.03 |
| $SO_3$ 11) | % | 0.8 | 0.7 | 0.8 |
| Tailings (according to Mocker, 45 μm) 7) | % | 0.01 | 0.02 | 0.1 |

1) according to DIN 66 131
2) according to DIN ISO 787/XI, JIS K 5101/18 (non-sieved)
3) according to DIN ISO 787/II, ASTM D 280, JIS K 5101/21
4) according to DIN 55921, ASTM D 1208, JIS K 5101/23
5) according to DIN ISO 787/IX, ASTM D 1208, JIS K 5101/24
6) according to DIN 53601, ASTM D 2414
7) according to DIN ISO 787/XVIII, JIS K 5101/20
9) Coulter counter, 50 μm capillary
10) relative to the substance dried 2 hours at 105° C.
11) relative to the substance annealed 2 hours at 1000° C.

| Hoesch SM 614 |  |  |
|---|---|---|
| $SiO_2$ content | % | 87 |
| Annealing loss (1 h at 1000° C.) | % | 9 |
| Drying loss (2 h at 120° C.) | % | 6 |
| pH (10% aqueous solution) |  | 6 |
| Average particle size precipitated silica acid | μm | 8 |

| Huber |  | Zeothix 265 | Zeothix 177 |
|---|---|---|---|
| Average particle size | m | 1.7 | 1.5 |

| -continued | | | |
|---|---|---|---|
| Drying loss 2 h at 105° C. | % | 7.0 | |
| Oil absorption | ml/100 g | 220 | 235 |
| pH | | 7 | 7 |
| BET surface | m²/g | 260 | 175 |
| Precipitated silica acids | | | |
| PPG | | HISIL T 600 | HISIL T 690 |
| Surface | m²/g | 150 | 150 |
| Average particle size | nm | 21 | 21 |
| pH | | 7.0 | 7 |
| Drying loss | % | 4–7 | 10 |
| precipitated silica acids | | | |
| Rhone-Poulenc Tixosil 333 | | | |
| pH | | | 6.8 |
| Annealing loss (900° C.) | % | | ≦11 |
| Particle size | μm | | 2.3 |
| BET surface | m²/g | | 300 |
| Oil adsorption | ml/100 g | | 370 |
| SiO₂ | % | | 97 |
| precipitated silica acid | | | |
| Silica gels | | Syloid 72 | Syloid 244 |
| Pore volume | ml/g | 1.2 | 1.6 |

| -continued | | | |
|---|---|---|---|
| Average particle size | μm | 4 | 2 |
| Wet screen overs | % | 0.02 | 0.02 |
| Drying loss | % | 1 | 4 |
| Annealing loss | % | 5 | 7 |
| SiO₂ content | % | 99 | 99.5 |
| pH | | 6 | 6 |

Further variations and modifications of the foregoing will be apparent to those skilled in the art and are intended to be encompassed by the appended claims.

German Priority application P 38 28 669.6-25 is relied on and incorporated herein.

We claim:

1. A shaped body for use as thermal heat insulation, comprising:
    precipitated silica mixed with one or more of the materials selected from the group consisting of:
    kaolinite, montmorillonite, mica and calcium sulfate;
    wherein the mixed precipitate silica and other materials are enclosed in an evacuated gas and watertight casing.

* * * * *